United States Patent
Simonis et al.

(10) Patent No.: US 12,522,104 B2
(45) Date of Patent: Jan. 13, 2026

(54) METHOD FOR PREDICTING A RESIDUAL SERVICE LIFE OF VEHICLE BATTERIES OF A FLEET OF ELECTRIC VEHICLES

(71) Applicant: Robert Bosch GmbH, Stuttgart (DE)

(72) Inventors: Christian Simonis, Leonberg (DE); Csaba Domokos, Simmozheim (DE)

(73) Assignee: ROBERT BOSCH GMBH, Stuttgart (DE)

( * ) Notice: Subject to any disclaimer, the term of this patent is extended or adjusted under 35 U.S.C. 154(b) by 354 days.

(21) Appl. No.: 17/911,116

(22) PCT Filed: Jul. 16, 2021

(86) PCT No.: PCT/EP2021/070019
§ 371 (c)(1),
(2) Date: Sep. 12, 2022

(87) PCT Pub. No.: WO2022/017984
PCT Pub. Date: Jan. 27, 2022

(65) Prior Publication Data
US 2023/0202344 A1 Jun. 29, 2023

(30) Foreign Application Priority Data
Jul. 24, 2020 (DE) .............. 10 2020 209 339.3

(51) Int. Cl.
*B60L 58/16* (2019.01)
*G07C 5/00* (2006.01)

(52) U.S. Cl.
CPC .............. *B60L 58/16* (2019.02); *G07C 5/008* (2013.01); *B60L 2240/70* (2013.01);
(Continued)

(58) Field of Classification Search
CPC .. B60L 58/16; B60L 2240/70; B60L 2260/44; B60L 2260/46; B60L 2260/50; G07C 5/008
(Continued)

(56) References Cited

U.S. PATENT DOCUMENTS

2016/0039295 A1    2/2016   Madurai-Kumar et al.
2016/0349330 A1   12/2016   Barfield, Jr. et al.
(Continued)

FOREIGN PATENT DOCUMENTS

CN    104778337 A     7/2015
CN    107064800 A   *   8/2017   ........... G01R 31/367
(Continued)

OTHER PUBLICATIONS

"Using Survival Analysis to Evaluate Medical Equipment Battery Life" (Year: 2016).*
(Continued)

*Primary Examiner* — Tiffany P Young
*Assistant Examiner* — Michael T Dowling
(74) *Attorney, Agent, or Firm* — NORTON ROSE FULBRIGHT US LLP

(57) ABSTRACT

A computer-implemented method is introduced for predicting a residual service life of vehicle batteries of a fleet of electric vehicles. In the method, parameters of the vehicle batteries are measured during the operation of the electric vehicles and transmitted to a server; a conditional probability is determined that the residual service life of a specific vehicle battery undershoots a predefined limit value at a point in time lying in the past; and the residual service life of vehicle batteries of the fleet is predicted as a function of the conditional probability.

10 Claims, 1 Drawing Sheet

(52) U.S. Cl.
  CPC ....... *B60L 2260/44* (2013.01); *B60L 2260/46* (2013.01); *B60L 2260/50* (2013.01)

(58) Field of Classification Search
  USPC ......................................................... 701/22
  See application file for complete search history.

(56) References Cited

U.S. PATENT DOCUMENTS

| | | |
|---|---|---|
| 2017/0036561 A1 | 2/2017 | Harman |
| 2018/0300968 A1 | 10/2018 | Kutkut |

FOREIGN PATENT DOCUMENTS

| | | |
|---|---|---|
| CN | 108279383 A | 7/2018 |
| DE | 102011017113 A1 | 10/2012 |
| EP | 3255442 A1 | 12/2017 |
| EP | 3591414 A1 | 1/2020 |

OTHER PUBLICATIONS

Learning of Activity Cycle Length (Year: 2019).*
Principal Components Analysis Preprocessing (Year: 2013).*
Yu, "State-of-Health Monitoring and Prediction of Lithium-Ion Battery Using Probabilistic Indication and State-Space Model," IEEE Transactions on Instrumentation and Measurement, 64 (2016) pp. 2937-2949.
He et al., "Online state-of-health estimation of lithium-ion batteries using Dynamic Bayesian Networks," Journal of Power Sources, 267 (2014) pp. 576-583.
International Search Report for PCT/EP2021/070019, Issued Oct. 26, 2021.
Fard et al., "A Bayesian Perspective on Early Stage Event Prediction in Longitudinal Data", IEEE Transactions on Knowledge and Data Engineering, 28 (2016) pp. 3126-3139.
Friedman et al., "Bayesian network classifiers", Machine Learning, 29 (1997) pp. 131-161.
Kersting, et al.: "Knowledge Discovery in Databases Graphical Probability Models", Lecture at TU Technical University Dortmund, LS 8 Computer Science Computer-based Statistics, May 20, 2014, pp. 1-37, URL: https://pdfs.semanticscho lar.org /2f1a/ 292100dba669d8ac3bd8985b1faa9c2829a2.pdf, with English translation of selected respresentative slides.

* cited by examiner

METHOD FOR PREDICTING A RESIDUAL SERVICE LIFE OF VEHICLE BATTERIES OF A FLEET OF ELECTRIC VEHICLES

FIELD

The present invention relates to a computer-implemented method for predicting a residual service life of vehicle batteries of a fleet of electric vehicles.

BACKGROUND INFORMATION

In electric vehicles, the residual service life of vehicle batteries, also known as the state of health or the SoH value, constitutes an important parameter for their economic value and their capacity. Knowledge about the way in which the SoH value decreases over time is consequently helpful or necessary.

Generally, the SoH value is not measured in the vehicle because the required sensor equipment would be too expensive. The SoH value is therefore estimated in the vehicle using a processor model. The estimation relates to the current SoH value. A prediction of the vehicle-individual state of health values is not available in current vehicle battery management systems. The driver or the vehicle fleet company (such as a car rental or car leasing company) is unable to calculate the future residual service life that remains for each individual vehicle. A prediction possibility is desirable so that the vehicle-individual residual service life can be predicted as early as possible and measures for extending the residual service life of the vehicle battery may possibly be triggered.

There is special interest in predicting the instant at which the residual service life of the vehicle battery will drop below a specific value, e.g., the value of 80% of the initial service life. In particular when many measured values are not yet available (incomplete parameter space), there is a lack of robust methods for a robust estimation and prediction of the state of health and for preventing an over-adaption of the processor model used in the vehicle for learning the current state of health with the aid of machine learning.

SUMMARY

According to an example embodiment, the present invention provides a method in which:
parameters of the vehicle batteries are measured during the operation of the electric vehicles and transmitted to a server,
a conditional probability is determined that the residual service life of a specific vehicle battery undershoots a predefined limit value for a point in time lying in the past, and
the residual service life of vehicle batteries of the fleet is predicted as a function of the conditional probability.

In its device aspects, the present invention provides a device which is set up to predict a residual service life of vehicle batteries of a fleet of electric vehicles. According to an example embodiment of the present invention, the device includes means for measuring parameters of the vehicle batteries that arise during an operation of the electric vehicles, and means for transmitting the measured parameters to a server, the server being set up to
determine a conditional probability that the residual service life of a specific vehicle battery undershoots a predefined limit value at an instant in the past; and
predict the residual service life of vehicle batteries of the fleet as a function of the conditional probability.

In addition, the present invention relates to a computer program product which includes instructions that upon a program execution by a computer, induce the computer to carry out the method/steps of the method of the present invention.

According to an example embodiment of the present invention, the method in particular relates to a method for a vehicle-individual prediction of the vehicle state of health which uses the Cloud connectivity of electric fleet vehicles. To allow for precise SoH calculations and predictions, the present invention makes it possible to make predictions regarding the residual service life (e.g., 80% residual capacity limit) already in an early phase of the service life of vehicle batteries when the actual parameter conditions of the fleet vehicles are not yet fully covered, even if only a limited number of training data for predictive machine learning of the residual service life are available. In addition, uncertainties can be evaluated by a quantified probability analysis which allows for a long-term prediction of the SoH values of the vehicle battery that manifests itself in an expected service life of each individual vehicle battery. The method according to the present invention furthermore is scalable to a high degree and steadily improves its accuracy the more data are available.

In one advantageous example embodiment of the present invention, operating parameters of the vehicle battery are modified if its residual service life undershoots a predefined value. For example, the maximally withdrawable power is restricted and/or the maximally permitted charge currents are restricted. It is also possible that the recharging is restricted to a limit value below the maximum capacity. The limit value is preferably dependent on the temperature. Preferably, the higher the temperature of the vehicle battery, the lower the limit value since high charges in conjunction with high temperatures accelerate the ageing of the vehicle battery.

In one preferred example embodiment of the present invention, parameters measured during the operation of the electric vehicles for a vehicle battery are combined to a feature vector characterizing the specific vehicle battery.

It is also preferred that the conditional probability is determined as a quotient whose denominator depends on a probability that the specific vehicle battery has a certain feature vector at the point in time lying in the past.

It is furthermore preferred that the denominator
is estimated by an empirical distribution on the basis of an event frequency, or
the denominator is determined on the basis of a parametric distribution, or
the denominator is determined on the basis of a normal distribution
or on the basis of a uniform distribution.

In a further preferred example embodiment of the present invention, the quotient has a numerator which is a function of the joint probability that the vehicle battery having the specific feature vector has a residual service life that undershoots the predefined limit value at the point in time lying in the past.

It is also preferred that the joint probability is modeled by a Bayesian network, that is, a directed cyclic graph $B=(v,\varepsilon)$, where $v$ is a set of vertices representing the variables, and $\varepsilon$ forming the set of edges that encode the dependencies between the variables.

It is furthermore preferred that the Bayesian network has a vertex without parents.

In another preferred example embodiment of the present invention, the vehicle batteries are labeled by a binary classifier, which has a first value, in particular the value zero, for vehicle batteries whose residual service life is greater than a threshold value, and which has a second value that differs from the first value, in particular the value 1, for vehicle batteries whose residual service life is less than a threshold value.

It is also preferred that a probability that the binary classifier has the second value at a point in time T that is later than a specific point in time t, is described by a survival function which is estimated by the conventional Kaplan-Meier estimator.

In addition, it is preferred that the probability of an event, that is, the probability that the binary classifier assumes the second value, is calculated by the cumulative death distribution function from the survival analysis.

In a further preferred example embodiment of the present invention, the structure of the Bayesian network is determined using the criterion of the minimum description length.

Additional advantages and example embodiments of the present invention result from the disclosure herein.

It is understood that the above-mentioned features and the features still to be described in the following text may be used not only in the individually indicated combination but also in other combinations or by themselves without departing from the framework of the present invention.

Exemplary embodiments of the present invention are shown in the figures and will be described in greater detail in the following description. Identical reference numerals in different figures describe the same elements or elements that are at least comparable in their function.

DETAILED DESCRIPTION OF EXAMPLE EMBODIMENTS

Figure 1:
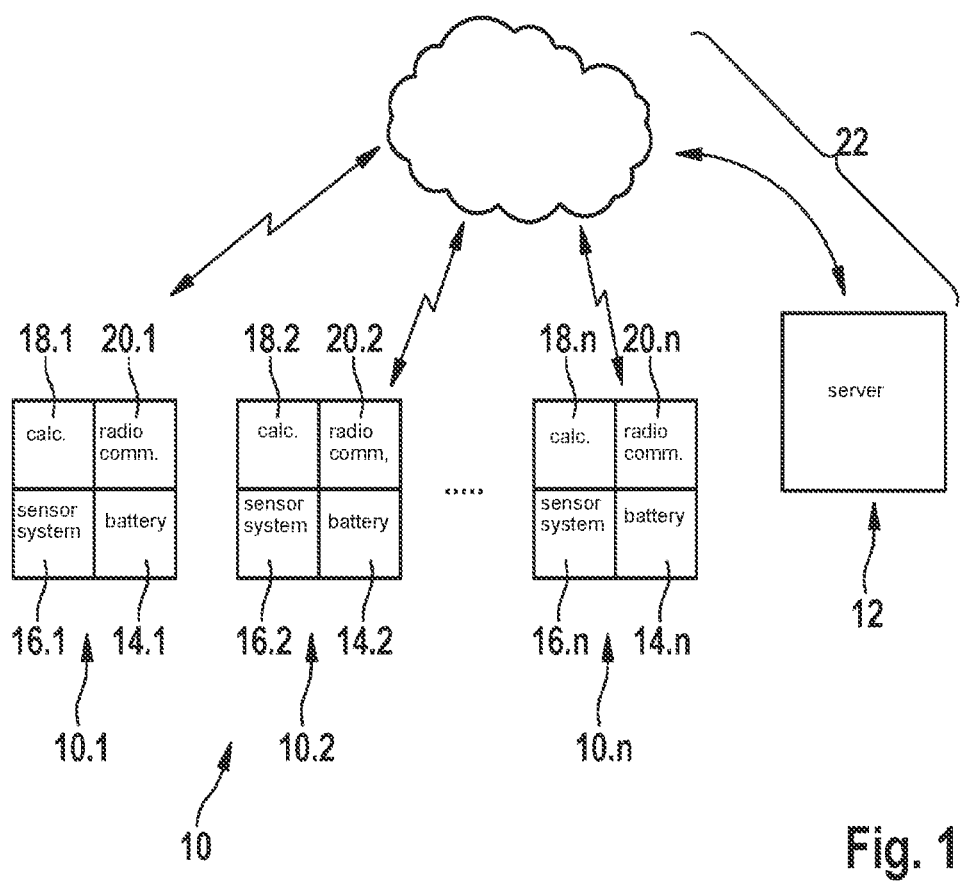
FIG. 1 shows the technical environment of the present invention.

In detail, FIG. 1 shows a fleet 10 of electric vehicles 10.1, 10.2, ..., 10.n together with a server 12 of an operator of vehicle fleet 10. Every electric vehicle 10.1, 10.2, ..., 10.n has an electric vehicle battery 14.1, 14.2, ..., 14.n and a sensor system 16.1, 16.2, ... 16.n for acquiring parameters of vehicle battery 14.1, 14.2, ..., 14.n such as its temperature, electrical voltage and electrical current strength. The vehicle batteries are preferably identical vehicle drive batteries.

Each electric vehicle also has calculation means (i.e., devices) 18.1, 18.2, ..., 18.n, which calculate from the data supplied by sensor system 16.1, 16.2, ..., 16.n an instantaneous SoH of the drive battery with the aid of machine learning using a calculation model. This calculation model is preferably independent of the prediction according to the present invention, less accurate and requires more measured values (i.e., a more complete parameter space).

In addition, each electric vehicle 10.1, 10.2, ..., 10.n has a Cloud connectivity in the form of mobile radio communication means (i.e., devices) 20.1, 20.2, ..., 20.n by which electric vehicle 10.1, 10.2, ..., 10.n is able to exchange information with server 12 of vehicle fleet 10 and/or other components of a Cloud 22.

The present invention is realized by an interaction of the components of the distributed system illustrated in FIG. 1.

Figure 2:
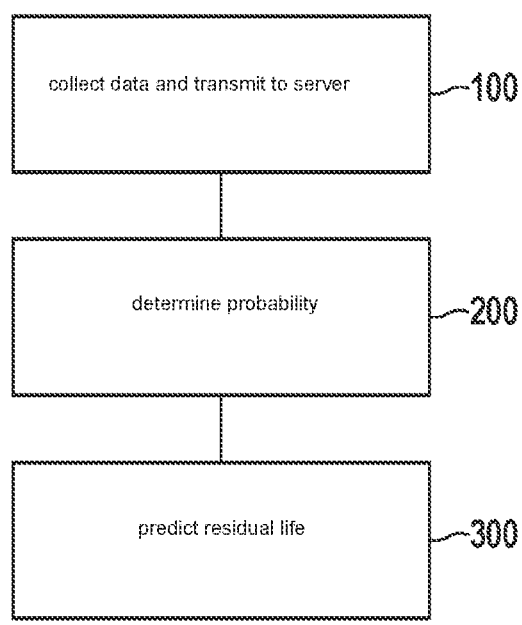
FIG. 2 shows a flow diagram as an exemplary embodiment of a method according to an example embodiment of the present invention.

FIG. 2 shows a flow diagram as an exemplary embodiment of a method according to the present invention. In a first phase of the method, data are collected that map the measured parameters of the vehicle batteries 14.1, 14.2, ..., 14.n. The collected data are transmitted to server 12. The first phase corresponds to step 100 in the flow diagram of FIG. 2.

With the aid of the parameters measured for one of vehicle batteries 14.1, 14.2, ..., 14.n in each case, feature vectors are formed for respective vehicle battery 14.1, 14.2, ..., 14.n. The measurements are undertaken at specific points in time. The variable to be determined is (initially) a remaining service life of a respective vehicle battery 14.1, 14.2, ..., 14.n at an instantaneous point in time.

The variable to be determined is defined as the conditional probability that a certain event (such as reaching/undershooting a residual service life) occurs in a vehicle battery 14.1, 14.2, ..., 14.n having a specific feature vector (x(t) at a specific point in time t.

Let it be assumed that data from n vehicle batteries 14.1, 14.2, ..., 14.n, which are independent from one another and identical, are collected by m different data sensors of sensor system 16.1, 16.2, ..., 16.n of vehicles 10.1, 10.2, ..., 10.n that allow for a continual measurement in each case. Examples of such data are electrical voltages and temperatures of vehicle batteries 14.1, 14.2, ..., 14.n, but the data are not restricted to these examples.

Despite continual measurements, only discretized measurements are considered for the evaluation. That means, the measurements received from an $i^{th}$ data source (e.g., a sensor of a vehicle battery) are transformed into a range $R_i \subset \mathbb{Q}$. The discretized data collected during the measurements are represented as feature vector $x \in R_1 \times \ldots \times R_m$. The data are collected with discrete time stamps, which are denoted by $t_1 < t_2 \ldots t_K$, that is, $t_i \in \mathbb{Z}$ for all $1 \leq i \leq K$. For all $1 \leq i \leq n$, $T_i \in \mathbb{Z}$ is defined as the event time, and $C_i \in \{t_1, \ldots, t_K\}$ as the censor time (that is, the given object is no longer monitored). It is assumed that $C_i \leq T_i$ applies. However, $T_i > t_K$ is also possible, which means that the event has occurred by the time of the last time stamp. The event status at instant $t_K$ is defined as $\delta_{ik} = [[T_i \leq t_k]]$, where $[[\cdot]]$ is denoted as the Iverson bracket, that is, [[true]]=1 and [[false]]=0.

A set of indexes $\mathcal{T}_i \subset \{1 \ldots, K\}$ is introduced so that $t_k < \min(C_i, T_i)$ applies, and $x_{ik}$ are available for all $k \in \mathcal{T}_i$. In this context, $x_{ik}$ is the feature vector of the $i^{th}$ vehicle battery at time $t_k$. The data collected for the $i^{th}$ vehicle battery are represented as $\mathcal{D}_i = \{(x_{ik}, \delta_{ik}) | k \in \mathcal{T}_i\}$. The entire dataset is denoted by $\mathcal{D} = \mathcal{D}_1 \cup \ldots \cup \mathcal{D}_n$.

A scenario is examined where data are available only for a few events at the instantaneous point in time $t_c = t_K$. The goal is the prediction of an event status at instant $t_f$, where $t_f > t_c$ and thus lies in the future. The event status for the vehicle battery i is denoted by $y_i(t_c) \in \{0,1\}$.

A binary classifier is generated by using $y_i(t_c)$ as a class label. If $y_i(t_c)=1$, then the event for vehicle battery i has occurred at instantaneous point in time $t_c$. In contrast, if $y_i(t_c)=0$, then the event has not yet occurred at the instantaneous point in time $t_c$.

The goal is to calculate the conditional probability $$P(y(t_c) = 1 | x, t \le t_c) = \frac{P(y(t_c) = 1, x, t \le t_c)}{P(x, t \le t_c)}$$

where x represents the feature vector for a given vehicle battery. The determination of this probability is represented by a second step 200 of the flow diagram. An event prediction based on the evaluation of probabilities is described in the paper "A Bayesian Perspective on Early Stage Event Prediction in Longitudinal Data", IEEE Transactions on Knowledge and Data Engineering, 28 (12):3126-3139, December 2016.

In the denominator of the fraction, the probability represents that the vehicle battery has the specific feature vector x at the specific point in time t.

The numerator of the fraction represents the joint probability $$P(y(t_c)=1,x,t \le t_c)$$

that the specific event has already occurred in a vehicle battery that has the specific feature vector x at the specific instant t.

The quotient thus is the probability that an individual vehicle battery has already undershot a residual service life of 80% of its expected total service life at an instant t in the past.

To model the joint probability $P(y(t_c),x,t \le t_c)$, step 200 includes the definition of a Bayesian network, that is, a directed cyclic graph $B=(v,\varepsilon)$, in which $v$ is the set of vertices that the variables represent, and $\varepsilon$ forms the set of edges that encode the dependencies between the variables. For example, a Bayesian network is described in paper "Bayesian network classifiers", Machine Learning, 29(2-3): 131-161, November 1997.

For this purpose, a random variable for each sensor measurement $x_i$ with $t1 \le i \le$ is initially examined for each feature vector x, and an additional variable that corresponds to the class label $y(t_c)$ is examined. To this end, the notation $\pi(x_i)$ for the set of the parents of the vertex belonging to $x_i$ is used. It is assumed that $\pi(y(t_c))=\emptyset$ applies, that is, that no parents exist for the vertex belonging to $y(t_c)$.

The joint probability may then be factorized to $$p(y(t_c) = 1, x, t \le t_c) = p(y(t_c) = 1, t \le t_c) \prod_{i=1}^{m} p(x_i | \pi(x_i))$$

Therefore, the following is obtained: [ . . . , sic]

The numerator $P(x, t \le t_c)$ is able to be estimated via the empirical distribution on the basis of the event frequencies, that is, $$P(x, t \le t_c) \approx \frac{|\{x_{ik} = x | (x_{ik}, \delta_{ik}) \in \mathcal{D}, t_k \le t_c\}|}{|\mathcal{D}|}$$

As an alternative, a parametric distribution may be assumed for $p(x,t \le t_c)$ such as the normal distribution or the uniform distribution.

To calculate the probability for the vertex without parents, theory from the field of survival analysis is used, based on a survival analysis:

The present invention relates to a scenario in which only a limited set of data is available for estimating the a priori probability (prior probability) $P(y(t_c)=1, t\ t_c)$ of an event. Some of the available data are incomplete, that is, censored data are present.

For each time $t_i$, all events are labeled either as event or as event-free. The survival function $S(t)=P(T>t)$ is estimated to calculate the labeling. This function indicates the probability that the instant T of an event occurrence is later than an instant t indicated in the network.

The conventional Kaplan-Meier estimator is used for the estimation $$\hat{S}(t) = \prod_{i:t_i<t} \left(1 - \frac{d_i}{n_i}\right)$$

where, $d_i$ represents the number of events at instant $t_i$, and $n_i$ is the number of objects that remain in the study at time $t_i$. The probability of an event $F_e(t)$ is calculated with the aid of the cumulative death distribution function $$F(t)=P(T \le t)=1-P(T>t)=1-S(t), \text{that is}, \hat{F}_e=1-\hat{S}(t)$$

In addition, let it be assumed that $Q(t)=P(C>t)$, which indicates the probability that time C of the censoring is later than a specific time t. The Kaplan-Meier estimator for Q(t) takes the form of $$\hat{Q}(t) = \prod_{i:t_i<t}\left(1 - \frac{n_i - d_i}{n_i}\right) = \prod_{i:t_i<t} \frac{d_i}{n_i}$$

The censoring probability is calculated as $$\hat{F}_c(t)=1-\hat{Q}(t)$$

At point in time t, the event label is assigned to all instances if $\hat{F}_e(t) \ge \hat{F}_c(t)$. In the other case, all instances are labeled as event-free.

The use of the labeling makes it possible to collect instances that are labeled as an event, and the experimental probability distribution $\hat{F}(t)$ is able to be calculated.

However, a parametric distribution F(t) is used instead. A popular example is the conventional Weibull distribution having two parameters a and b, that is, $$F(t) = 1 - e^{-\left(\frac{t}{b}\right)^a}.$$

This parametric distribution is dependent on data.

To learn the structure, that is, the edge quantity of the Bayesian network, the criterion of the minimum description length $$MDL(\mathcal{B}|\mathcal{D}) = \frac{\log N}{2}d - \ell(\mathcal{B}|\mathcal{D})$$

Is able to be used, where $$N = |\mathcal{D}|, d = \prod_{i=1}^{m} R_i$$

is the number of free parameters in the network. The log-likelihood function may be defined as $$\ell(\mathcal{B}|\mathcal{D}) = \log\left(\prod_{i=1}^{n}\prod_{k\in\mathcal{T}_i} p_B(x_{ik})\right)$$

$$\ell(\mathcal{B}|\mathcal{D}) = \sum_{i=1}^{n}\sum_{k\in\mathcal{T}_i} \log(P_B(x_{ik}))$$

$$\ell(\mathcal{B}|\mathcal{D}) = \sum_{i=1}^{n}\sum_{k\in\mathcal{T}_i} \log\left(\prod_{j=1}^{m} \theta_{(x_{ik})_j|\pi((x_{ik})_j)}\right)$$

where Type equation here.

$$\theta_{(x_{ik})_j|\pi((x_{ik})_j)} = P((x_{ik})_j|\pi((x_{ik})_j))$$

If the empirical distribution $\hat{P}(\cdot)$ is assumed, which is defined by the frequency of the events in the training set, that is $$P(X) = \frac{1}{N}\sum_{i=1}^{n}\sum_{k=\mathcal{T}_i}[\![x_{ik} \in X]\!]$$

for each event $X \in R_1 \times \ldots \times R_m$,
the log-likelihood function is able to be written as $$\ell(\mathcal{B}|\mathcal{D}) = N\sum_{i=1}^{n}\sum_{k\in\mathcal{T}_i}\sum_{j=1}^{m}\sum_{\substack{(x_{ik})_j \in R_j, \\ \pi((x_{ik})_j) \in R_{\pi((x_{ik})_j)}}} \hat{P}((x_{ik})_j, \pi((x_{ik})_j))\log(\theta_{(x_{ik})_j|\pi((x_{ik})_j)})$$

which is maximized as $\hat{P}((x_{ik})_j, \pi((x_{ik})_j)) = \Theta_{(x_{ik})_j|\pi((x_{ik})_j)}$ This criterion MDL(B|D) may be minimized by a local search algorithm (e.g., by the conventional hill climbing algorithm).

With the aid of the Bayesian network determined in this way, the numerator of the conditional probability $$P(y(t_c) = 1|x, t \leq t_c) = \frac{P(y(t_c) = 1, x, t \leq t_c)}{P(x(t) \leq t_c)}$$

is able to be calculated.

The resulting knowledge of the conditional probability $$P(y(t_c)=1|x,t\leq t_c)$$

allows for a prediction of the residual service life of vehicle batteries of the fleet, which occurs in step 300, as a function of the conditional probability, as will be described in the following text.

The value of the probability $P(y(t_c)=1|x,t\leq t_c)$ that an event has occurred by the instantaneous point in time $t_c$ amounts to between 0 and 1 according to the definition.

Probability $P(y(t_c)=0|x,t\leq t_c)$ complementary thereto is able to be calculated on the basis of general characteristics of the probability as $$P(y(t_c)=0|x,t\leq t_c)=1-P(y(t_c)=1|x,t\leq t_c).$$

Therefore, if the probability that an event has occurred by the instantaneous point in time $t_c$ can be calculated, then it is also possible to calculate the probability that the event has not occurred by instantaneous point in time $t_c$. In the present case, the latter probability is of interest, on the one hand. On the other hand, the training data for the complementary probability $P(y(t_c)=0|x,t\leq t_c)$ are available. For that reason, this probability is calculated at the outset, for instance. The calculated value may then be used to calculate the probability actually of interest in that $t_c$ is replaced by $t_f$.

What is claimed is:

1. A computer-implemented method for predicting residual service lives of vehicle batteries of a fleet of electric vehicles, comprising the following steps:
    measuring parameters of the vehicle batteries during an operation of the electric vehicles, and transmitting the measured parameters to a server;
    determining a conditional probability that a residual service life of a specific one of the vehicle batteries undershoots a predefined limit value at a point in time lying in the past; and
    predicting the residual service lives of the vehicle batteries of the fleet as a function of the conditional probability, wherein the vehicle batteries are labeled by a binary classifier, which has a first value for a first subset of the vehicle batteries whose residual service life is greater than a threshold value, and which has a second value that differs from the first value, for a second subset of the vehicle batteries whose residual service life is less than a threshold value, wherein a probability that the binary classifier has the second value at a point in time T that is later than a specific point in time t is described by a survival function which is estimated by a Kaplan-Meier estimator, and wherein the probability that the binary classifier assumes the second value corresponds to the probability of an event that is calculated by a cumulative death distribution function from survival analysis.

2. The method as recited in claim 1, wherein the parameters measured during the operation of the electric vehicles for each vehicle battery are combined to a feature vector characterizing the specific one of the vehicle batteries.

3. The method as recited in claim 2, wherein the conditional probability is determined as a quotient whose denominator is a function of a probability that the specific vehicle battery has a specific feature vector at the point in time lying in the past.

4. The method as recited in claim 3, wherein the denominator is:
    estimated by an empirical distribution based on an event frequency, or
    determined based on a parametric distribution, or
    determined based on a normal distribution, or
    determined based on a uniform distribution.

5. The method as recited in claim 3, wherein the quotient has a numerator, which is a function of a joint probability that the specific vehicle battery having the specific feature vector has a residual service life that undershoots the predefined limit value at the point in time lying in the past.

6. The method as recited in claim 5, wherein the joint probability is modeled by a Bayesian network, that is, by a directed cyclic graph B=(v, ε), where v is the set of vertices that represents the variables, and ε forms a set of edges that encode the dependencies between variables.

7. The method as recited in claim 6, wherein the Bayesian network has a vertex without parents.

8. The method as recited in claim 6, wherein the structure of the Bayesian network is determined using a criterion of a minimum description length.

9. A device configured to predict a residual service life of vehicle batteries of a fleet of electric vehicles, the device comprising:
    a sensor system configured to measure parameters of the vehicle batteries occurring during operation of the electric vehicles; and a transmitter configured to transmit the measured parameters to a server, the server being configured to:

determine a conditional probability that a residual service life of a specific one of the vehicle batteries undershoots a predefined limit value at a point in time lying in the past; and predict the residual service life of the vehicle batteries of the fleet as a function of the conditional probability, wherein the vehicle batteries are labeled by a binary classifier, which has a first value for a first subset of the vehicle batteries whose residual service life is greater than a threshold value, and which has a second value that differs from the first value, for a second subset of the vehicle batteries whose residual service life is less than a threshold value, wherein a probability that the binary classifier has the second value at a point in time T that is later than a specific point in time t is described by a survival function which is estimated by a Kaplan-Meier estimator, and wherein the probability that the binary classifier assumes the second value corresponds to the probability of an event that is calculated by a cumulative death distribution function from survival analysis.

10. A non-transitory computer-readable medium on which is stored a computer program including instructions for predicting a residual service life of vehicle batteries of a fleet of electric vehicles, the instructions, when executed by a computer, causing the computer to perform the following steps:

measuring parameters of the vehicle batteries during an operation of the electric vehicles, and transmitting the measured parameters to a server;

determining a conditional probability that a residual service life of a specific one of the vehicle batteries undershoots a predefined limit value at a point in time lying in the past; and predicting the residual service life of the vehicle batteries of the fleet as a function of the conditional probability, wherein the vehicle batteries are labeled by a binary classifier, which has a first value for a first subset of the vehicle batteries whose residual service life is greater than a threshold value, and which has a second value that differs from the first value, for a second subset of the vehicle batteries whose residual service life is less than a threshold value, wherein a probability that the binary classifier has the second value at a point in time T that is later than a specific point in time t is described by a survival function which is estimated by a Kaplan-Meier estimator, and wherein the probability that the binary classifier assumes the second value corresponds to the probability of an event that is calculated by a cumulative death distribution function from survival analysis.

* * * * *